G. RIDLER.
Churn-Dashers.
No. 144,290. Patented Nov. 4, 1873.
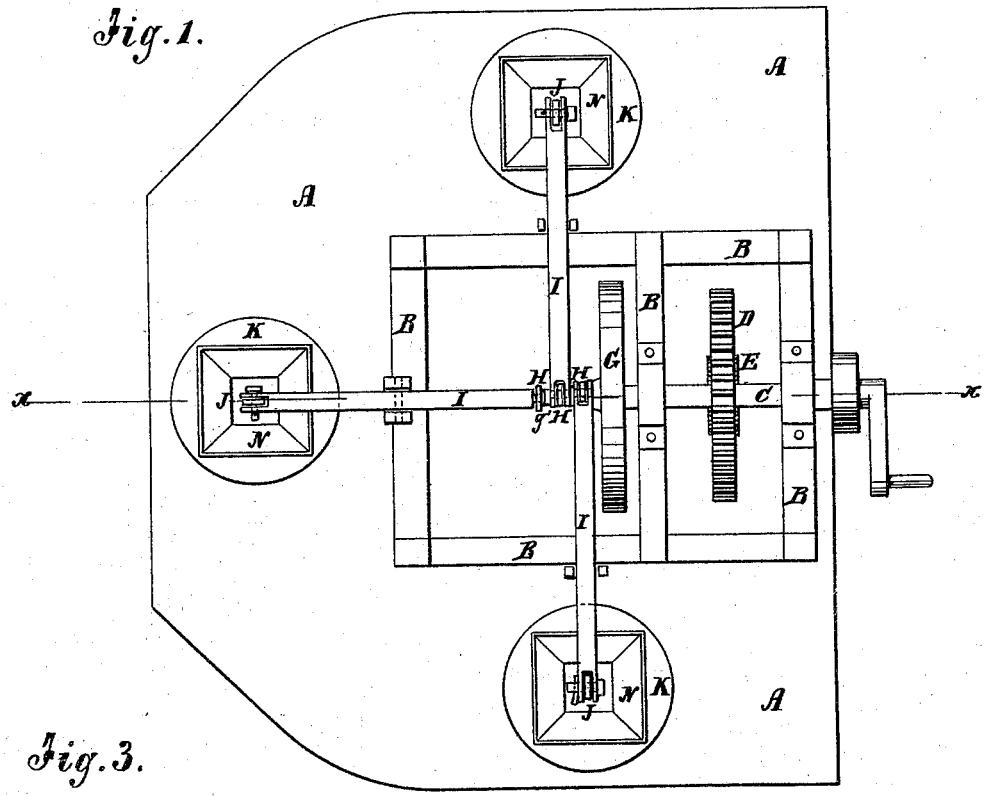
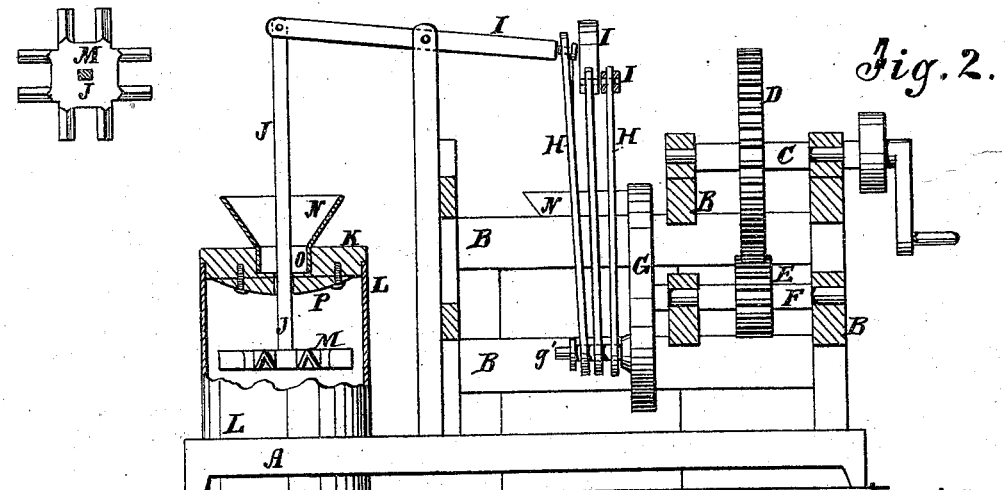
Witnesses:
Inventor:

UNITED STATES PATENT OFFICE.

GEORGE RIDLER, OF RICKARDSVILLE, IOWA.

IMPROVEMENT IN CHURN-DASHERS.

Specification forming part of Letters Patent No. 144,290, dated November 4, 1873; application filed July 26, 1873.

*To all whom it may concern:*

Be it known that I, GEORGE RIDLER, of Rickardsville, in the county of Dubuque and State of Iowa, have invented a new and useful Improvement in Churning Apparatus, of which the following is a specification:

Figure 1 is a top view of the complete churning apparatus. Fig. 2 is a vertical section of the same taken through the line $x$ $x$, Fig. 1. Fig. 3 is a top view of my improved dasher.

Similar letters of reference indicate corresponding parts.

My invention consists in an improved form of churn-dasher; and I herein show and describe the same in connection with other mechanism necessary to form a complete churning apparatus.

A represents the platform of the apparatus, to which is attached the frame B, that incloses and supports the operating mechanism. C is the driving-shaft, to the end of which is attached a crank or pulley according as hand or other power is to be used. The shaft C revolves in bearings attached to the frame-work B, and to it is attached a large gear-wheel, D, the teeth of which mesh into the teeth of a small gear-wheel E attached to a shaft, F. The shaft F revolves in bearings in the frame-work B, and to its inner end is attached a balance-wheel, G, to give steadiness of motion to the machine. To the balance-wheel G is attached a crank-pin, $g'$, to receive the lower end of one or more connecting-rods, H, according as one or more churns are to be operated at a time. The upper end of each connecting-rod H is pivoted to the inner end of a lever, I, which is pivoted to the upwardly-projecting end of a post of the frame B, or to some other suitable support. To the outer end of the lever I is pivoted the upper end of the dasher-shaft J, which passes down through the cover K into the churn-body L. The churns L set in holes or recesses in the platform A, so as to be held securely in place while being used, and from which they may be readily lifted when desired. M is the dasher, which is formed by halving two bars to each other, and attaching them at their centers to the lower end of the dasher-handle J. The middle part of the ends of the bars of the dasher is cut away, and the arms thus formed are made V-shaped upon their upper side, and have V-shaped longitudinal grooves formed in their lower side, as shown in Figs. 3 and 4. The under side of the middle part of the dasher M is made concave, which causes the dasher to take a better hold upon the milk, and tends to prevent spattering. In the middle part of the cover K is formed a chamber, O, to receive the milk and fine butter that may be carried up by the dasher-handle J. The bottom of the chamber O is formed by attaching a plate, P, to the lower side of the cover K. The funnel N forms an upward continuation of the chamber O, while its small end lines or forms the sides thereof. The plate P is made convex upon its lower side so as to scatter the milk that may be projected against it by the dasher, and is secured to the cover by screws or other means, that enable it to be readily detached for convenience in cleaning the chamber O.

Having thus described my invention, I claim as new and desire to secure by Letters Patent—

The dasher M formed of bars crossing each other, as specified, said bars made V shape with V-grooves in their under side, as and for the purpose specified.

GEORGE RIDLER.

Witnesses:
J. W. LEWIS,
W. P. ALLEN.